US011642651B2

United States Patent
Kim et al.

(10) Patent No.: US 11,642,651 B2
(45) Date of Patent: May 9, 2023

(54) CUCURBITURIL-POLYETHYLENIMINE-SILICA COMPLEX, PREPARATION METHOD THEREOF AND CARBON DIOXIDE ABSORBENT COMPRISING SAME

(71) Applicant: KOREA INSTITUTE OF ENERGY RESEARCH, Daejeon (KR)

(72) Inventors: Hyun-uk Kim, Daejeon (KR); Young Cheol Park, Daejeon (KR); Jong-ho Moon, Daejeon (KR); Hoon Beom Park, Daejeon (KR); Muhammad Sohail, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 716 days.

(21) Appl. No.: 16/662,025

(22) Filed: Oct. 24, 2019

(65) Prior Publication Data
US 2020/0129957 A1   Apr. 30, 2020

(30) Foreign Application Priority Data
Oct. 26, 2018   (KR) .......... 10-2018-0128694

(51) Int. Cl.
*B01J 20/26*   (2006.01)
*B01D 53/14*   (2006.01)
(Continued)

(52) U.S. Cl.
CPC ........ *B01J 20/265* (2013.01); *B01D 53/1475* (2013.01); *B01D 53/62* (2013.01); *B01J 20/103* (2013.01); *B01J 20/283* (2013.01); *B01J 20/28059* (2013.01); *B01D 2252/10* (2013.01); *B01D 2252/2053* (2013.01); *B01D 2257/504* (2013.01)

(58) Field of Classification Search
CPC .. B01J 20/265; B01J 20/103; B01J 20/28059; B01J 20/283; B01D 53/1475; B01D 53/62; B01D 2252/10; B01D 2252/2053; B01D 2257/504
USPC ........................................................ 95/139
See application file for complete search history.

(56) References Cited

U.S. PATENT DOCUMENTS
6,869,466 B2   3/2005 Day et al.

FOREIGN PATENT DOCUMENTS
KR   1020110006073 A   1/2011

OTHER PUBLICATIONS

Carmen Stoffelen and Jurriaan Huskens, "Size-tunable supramolecular nanoparticles mediated by ternary cucurbit[8]uril host-guest interactions", Chem. Commun., 2013, 49, 6740-6742. (Year: 2013).*

(Continued)

*Primary Examiner* — Anita Nassiri-Motlagh
(74) *Attorney, Agent, or Firm* — Cantor Colburn LLP

(57) ABSTRACT

The present disclosure relates to a cucurbituril-polyethylenimine-silica complex, a method for preparing the same and a carbon dioxide absorbent containing the same. According to the present disclosure, a cucurbituril-polyethylenimine-silica complex may be prepared by forming a complex wherein a cucurbituril is bound to polyethylenimine and including the same inside silica, and it may be used as a carbon dioxide absorbent with superior thermal stability and prevented formation of urea.

11 Claims, 20 Drawing Sheets

(51) Int. Cl.
   *B01D 53/62*   (2006.01)
   *B01J 20/28*   (2006.01)
   *B01J 20/10*   (2006.01)
   *B01J 20/283*  (2006.01)

(56) References Cited

OTHER PUBLICATIONS

Li et al., "An eco-friendly in situ activatable antibiotic via cucurbit[8]uril-mediated supramolecular crosslinking of branch polyethylenimine", Chem. Commun., 2017, 53, 5870-5873. (Year: 2017).*

Midhun Mohan et al., "Surface modification induced enhanced CO2 sorption in cucurbit[6]uril, an organic porous material," Phys. Chem. Chem. Phys., 2017, pp. 25564-25573, vol. 19.

Anthony Day et al., "Controlling Factors in the Synthesis of Cucurbituril and Its Homologues", J. Org. Chem., 2001, pp. 8094-8100, vol. 66, No. 24, American Chemical Society.

Gerard Ferey, "Hybrid porous solids: past, present, future," Chemical Society Reviews, 2007, pp. 191-214, vol. 37, The Royal Society of Chemistry.

Sang Yong Jon et al., "Facile Synthesis of Cucurbit[n]uril Derivatives via Direct Functionalization: Expanding Utilization of Cucurbit[n]uril", J. Am. Chem. Soc., 2003, pp. 10186-10187, American Chemical Society.

W. A. Freeman et al., "Cucurbituril", J. Am. Chem. Soc., 1981, pp. 7367-7368, American Chemical Society.

* cited by examiner

Sample after regeneration at 110 °C

Carbamate removed

CUCURBITURIL-POLYETHYLENIMINE-SILICA COMPLEX, PREPARATION METHOD THEREOF AND CARBON DIOXIDE ABSORBENT COMPRISING SAME

CROSS-REFERENCE TO RELATED APPLICATIONS

This application claims, under 35 U.S.C. § 119, the priority of Korean Patent Application No. 10-2018-0128694 filed on Oct. 26, 2018 in the Korean Intellectual Property Office, the disclosure of which is incorporated herein by reference in its entirety.

TECHNICAL FIELD

The present disclosure relates to a cucurbituril-polyethylenimine-silica complex, a method for preparing the same and a carbon dioxide absorbent containing the same. More specifically, it relates to a technology of preparing a cucurbituril-polyethylenimine-silica complex by forming a complex wherein a cucurbituril is bound to polyethylenimine and including the same inside silica, and applying the same as a carbon dioxide absorbent with superior thermal stability and prevented formation of urea.

BACKGROUND

The global energy demand relies primarily on fossil fuel. Despite the policies to tackle climate change by governments, the use of fossil fuel is expected to increase continuously in the upcoming 10 years. Fossil fuel burning is still the number one cause of carbon dioxide generation, which contributes to global warming. In 2013, the $CO_2$-equivalent concentration was 296 ppmv, which amounts to more than 40% of increase as compared to mid-1800s. The average increase rate in the recent 10 years was 2 ppm/year. For fossil fuel to be used primarily for electric power production, it is necessary to successfully introduce a practical and cost-effective $CO_2$ capture technology in the existing or newly constructed plants.

Carbon capture and sequestration (or storage) (CCS) is a physical process of capturing carbon dioxide artificially from its sources and storing the same before it is released into the atmosphere. CCS prevents $CO_2$ from being released in large scale by separating, liquefying and storing $CO_2$, and is considered the most practical way of reducing greenhouse gas.

The successful development of the CCS technology relies on the successful research, development and application of elementary technologies for capture, compression, transportation, storage, etc. of carbon dioxide. In particular, the $CO_2$ capture technology is actively studied in developed countries including the US, Europe, Japan, etc. because it accounts for about 80% of the total cost of CCS.

While $CO_2$ adsorption using liquid base media such as aqueous amines is widely used and mature, $CO_2$ adsorption using solid media is considered as the $CO_2$ capture technology of the future which is more practical and less costly. Unlike liquid absorbents, solid absorbents are advantageous in that they can be used under a very broad range of temperatures from ambient temperature to 700° C., less wastes are generated during cycles, and the consumed solid absorbents can be processed easily without undue precautionary measures for the environment.

Meanwhile, porous materials wherein pores are regularly distributed in multi-dimensional framework structures can selectively adsorb gas molecules or small organic molecules depending on the steric and chemical environment of the pores and can be used for applications such as catalysts, ion exchange, separation of mixtures, etc. (non-patent document 1).

Cucurbit[6]uril is a cyclic oligomer made of six glycoluril monomers linked by methylene bridges, synthesized from inexpensive glycoluril and formaldehyde. The structure of the compound was elucidated by W. A. Freeman and coauthors (non-patent document 2). Cucurbit[6]uril is a compound with a chemical formula of $C_{36}H_{36}N_{24}O_{12}$, which has an internal cavity. Cucurbituril analogues and derivatives are synthesized by the methods published in the literatures by K. Kim and coauthors (non-patent document 3) or A. Day and coauthors (non-patent document 4). In addition, a method of adsorbing gaseous or volatile compounds on cucurbituril analogues and derivatives is studied (patent document 1).

The inventors of the present disclosure have prepared a cucurbituril-polyethylenimine-silica complex wherein a cucurbituril is bound to polyethylenimine and including the same inside silica, and have noticed that it can be used as a carbon dioxide absorbent with superior thermal stability and prevented formation of urea.

REFERENCES OF THE RELATED ART

Patent Document

Patent document 1. U.S. Pat. No. 6,869,466.

Non-Patent Documents

Non-patent document 1. Férey, Gérard. *Chemical Society Reviews* 37.1 (2008): 191-214.

Non-patent document 2. Freeman, W. A., W. L. Mock, and N. Y. Shih. *Journal of the American Chemical Society* 103.24 (1981): 7367-7368.

Non-patent document 3. Jon, Sang Yong, et al. *Journal of the American Chemical Society* 125.34 (2003): 10186-10187.

Non-patent document 4. Day, Anthony, et al. *The Journal of Organic Chemistry* 66.24 (2001): 8094-8100.

SUMMARY

The present disclosure is directed to preparing a cucurbituril-polyethylenimine-silica complex wherein a cucurbituril is bound to polyethylenimine and including the same inside silica, and applying the same as a carbon dioxide absorbent with superior thermal stability and prevented formation of urea.

The present disclosure provides a cucurbituril-polyethylenimine complex wherein a cucurbituril represented by Chemical Formula 1 is bound to polyethylenimine:

[Chemical Formula 1]

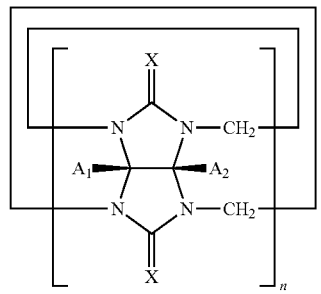

wherein n is an integer from 4 to 20,

X is O, S or NH, and each of $A_1$ and $A_2$, which are identical to or different from each other, is independently H, OR, SR, NHR, COOH, $O(CH_2)_aR$ or $O(CH_2)_aSR$, wherein a is an integer from 1 to 5 and R is H, a halogen, $C_1$-$C_{30}$ alkyl, $C_2$-$C_{30}$ alkenyl, $C_2$-$C_{30}$ alkynyl, $C_2$-$C_{30}$ carbonylalkyl, $C_3$-$C_{30}$ cycloalkyl, $C_2$-$C_{30}$ heterocycloalkyl, $C_6$-$C_{30}$ aryl, $C_6$-$C_{30}$ aryl $C_1$-$C_{30}$ alkyl, $C_2$-$C_{30}$ heteroaryl or $C_2$-$C_{30}$ heteroaryl $C_1$-$C_{30}$ alkyl.

The cucurbituril represented by Chemical Formula 1 may be cucurbit[6]uril, wherein n is 6, each of $A_1$ and $A_2$ is independently H, and X is O.

The polyethylenimine may have a molecular weight of 100-50000.

The present disclosure also provides a cucurbituril-polyethylenimine-silica complex containing a silica and the cucurbituril-polyethylenimine complex according to the present disclosure, which is included inside the silica.

The cucurbituril-polyethylenimine-silica complex may have a BET specific surface area of 1-500 $m^2$/g.

The cucurbituril may be cucurbit[6]uril, the polyethylenimine may have a molecular weight of 500-12000, and the cucurbituril-polyethylenimine-silica complex may have a BET specific surface area of 20-60 $m^2$/g.

The present disclosure also provides a carbon dioxide absorbent containing the cucurbituril-polyethylenimine complex according to the present disclosure.

The present disclosure also provides a carbon dioxide absorbent containing the cucurbituril-polyethylenimine-silica complex according to the present disclosure.

The present disclosure also provides a method for preparing a cucurbituril-polyethylenimine complex, which includes a step of mixing and dispersing a cucurbituril represented by Chemical Formula 1, polyethylenimine and a solvent:

[Chemical Formula 1]

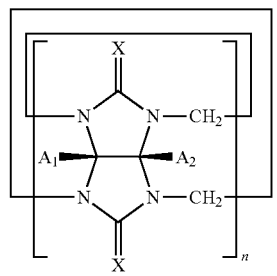

wherein n is an integer from 4 to 20,

X is O, S or NH, and each of $A_1$ and $A_2$, which are identical to or different from each other, is independently H, OR, SR, NHR, COOH, $O(CH_2)_aR$ or $O(CH_2)_aSR$, wherein a is an integer from 1 to 5 and R is H, a halogen, $C_1$-$C_{30}$ alkyl, $C_2$-$C_{30}$ alkenyl, $C_2$-$C_{30}$ alkynyl, $C_2$-$C_{30}$ carbonylalkyl, $C_3$-$C_{30}$ cycloalkyl, $C_2$-$C_{30}$ heterocycloalkyl, $C_6$-$C_{30}$ aryl, $C_6$-$C_{30}$ aryl $C_1$-$C_{30}$ alkyl, $C_2$-$C_{30}$ heteroaryl or $C_2$-$C_{30}$ heteroaryl $C_1$-$C_{30}$ alkyl.

The solvent may be one or more selected from methanol, ethanol, water, dimethylformamide, diethylformamide, N-methyl-2-pyrrolidone, dimethyl sulfoxide and dimethylacetamide.

The present disclosure also provides a method for preparing a cucurbituril-polyethylenimine-silica complex, which includes (a) a step of obtaining a dispersion solution containing a cucurbituril-polyethylenimine complex by mixing and dispersing a cucurbituril represented by Chemical Formula 1, polyethylenimine and a solvent, and (b) a step of further mixing silica in the dispersion solution:

[Chemical Formula 1]

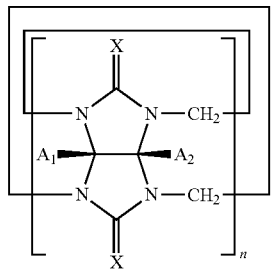

wherein n is an integer from 4 to 20,

X is O, S or NH, and each of $A_1$ and $A_2$, which are identical to or different from each other, is independently H, OR, SR, NHR, COOH, $O(CH_2)_aR$ or $O(CH_2)_aSR$, wherein a is an integer from 1 to 5 and R is H, a halogen, $C_1$-$C_{30}$ alkyl, $C_2$-$C_{30}$ alkenyl, $C_2$-$C_{30}$ alkynyl, $C_2$-$C_{30}$ carbonylalkyl, $C_3$-$C_{30}$ cycloalkyl, $C_2$-$C_{30}$ heterocycloalkyl, $C_6$-$C_{30}$ aryl, $C_6$-$C_{30}$ aryl $C_1$-$C_{30}$ alkyl, $C_2$-$C_{30}$ heteroaryl or $C_2$-$C_{30}$ heteroaryl $C_1$-$C_{30}$ alkyl.

The cucurbituril may be cucurbit[6]uril, the polyethylenimine may have a molecular weight of 500-12000, the solvent may be anhydrous methanol, a step of activating the silica at 150-250° C. for 20-30 hours in advance may be further included before the step (b), a weight ratio of the cucurbituril-polyethylenimine complex and the silica may be 1:0.5-1.5, and the cucurbituril-polyethylenimine-silica complex may have a BET specific surface area of 20-60 $m^2$/g.

According to the present disclosure, a cucurbituril-polyethylenimine-silica complex may be prepared by forming a complex wherein a cucurbituril is bound to polyethylenimine and including the same inside silica, and it may be used as a carbon dioxide absorbent with superior thermal stability and prevented formation of urea.

BRIEF DESCRIPTION OF DRAWINGS

(FIG. 8B).

FIG. 12A and FIG. 12B show results under different adsorption-desorption conditions [Adsorption-desorption conditions are described in the graphs. Example 7: PEI-CB[6]@Silica, Comparative Example 1: PEI@Silica].

DETAILED DESCRIPTION OF EMBODIMENTS

Figure 1:
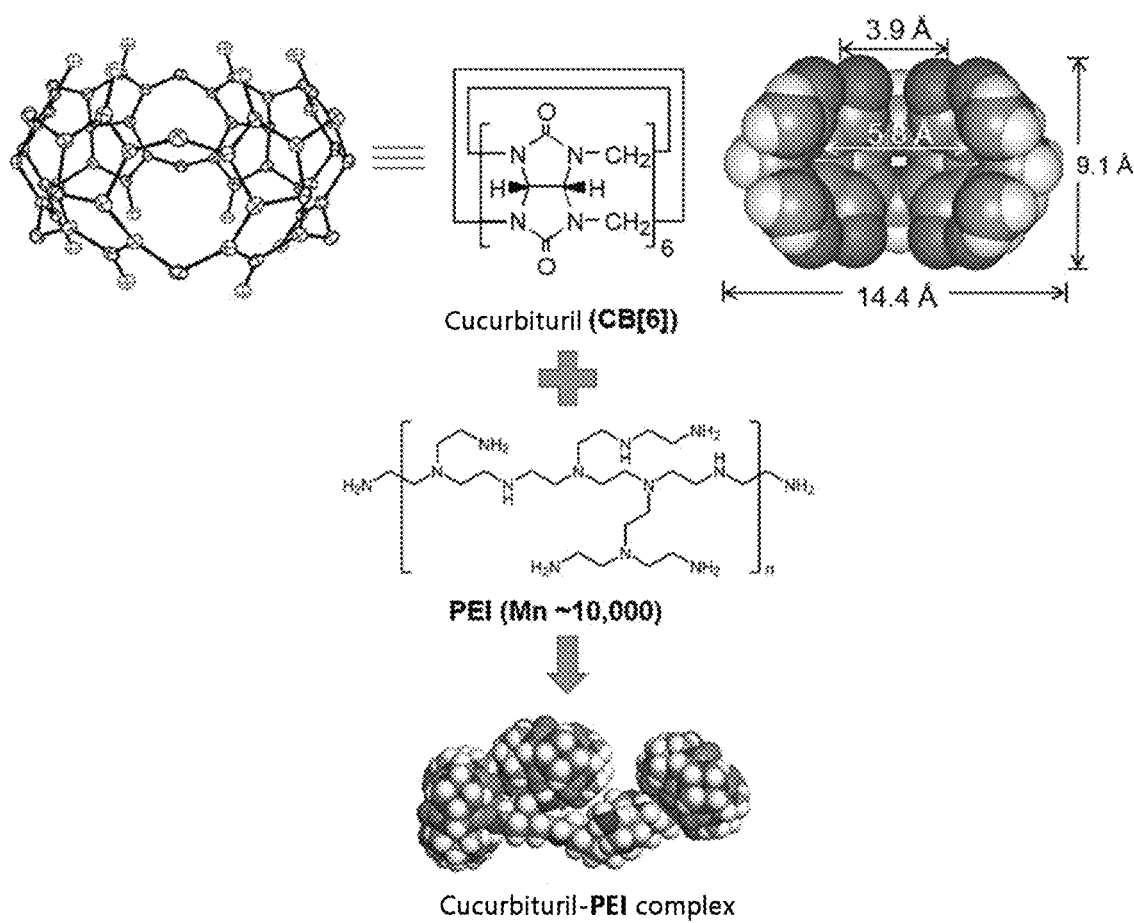
FIG. 1 schematically shows the structure of cucurbituril-PEI complexes synthesized in Examples 1-4 of the present disclosure.

Hereinafter, various aspects and exemplary embodiments of the present disclosure are described in more detail.

The present disclosure relates to a cucurbituril-polyethylenimine complex wherein a cucurbituril represented by Chemical Formula 1 is bound to polyethylenimine:

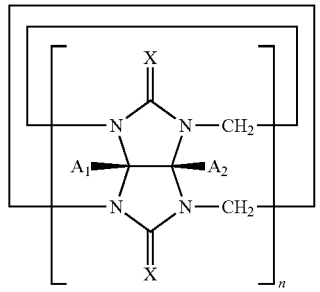

[Chemical Formula 1]

wherein n is an integer from 4 to 20,

X is O, S or NH, and each of $A_1$ and $A_2$, which are identical to or different from each other, is independently H, OR, SR, NHR, COOH, $O(CH_2)_aR$ or $O(CH_2)_aSR$, wherein a is an integer from 1 to 5 and R is H, a halogen, $C_1$-$C_{30}$ alkyl, $C_2$-$C_{30}$ alkenyl, $C_2$-$C_{30}$ alkynyl, $C_2$-$C_{30}$ carbonylalkyl, $C_3$-$C_{30}$ cycloalkyl, $C_2$-$C_{30}$ heterocycloalkyl, $C_6$-$C_{30}$ aryl, $C_6$-$C_{30}$ aryl $C_1$-$C_{30}$ alkyl, $C_2$-$C_{30}$ heteroaryl or $C_2$-$C_{30}$ heteroaryl $C_1$-$C_{30}$ alkyl.

The cucurbituril-polyethylenimine complex according to the present disclosure has remarkably improved thermal stability because the cucurbituril and polyethylenimine are linked with each other. In addition, the formation of urea can be prevented through passivation of the primary amine of the polyethylenimine and remarkably superior carbon dioxide adsorption performance can be provided.

The cucurbituril represented by Chemical Formula 1 may be cucurbit[6]uril wherein n is 6, each of $A_1$ and $A_2$ is independently H, and X is O.

The polyethylenimine may have a molecular weight of 100-50000, specifically 300-30000, more specifically 500-12000.

The present disclosure also provides a cucurbituril-polyethylenimine-silica complex containing a silica and the cucurbituril-polyethylenimine complex according to the present disclosure, which is included inside the silica.

The cucurbituril-polyethylenimine-silica complex may have a BET specific surface area of 1-500 m$^2$/g, specifically 10-300 m$^2$/g, more specifically 20-60 m$^2$/g.

The cucurbituril may be cucurbit[6]uril, the polyethylenimine may have a molecular weight of 500-12000, and the cucurbituril-polyethylenimine-silica complex may have a BET specific surface area of 20-60 m$^2$/g. Remarkably superior carbon dioxide adsorption performance and thermal stability are achieved when the above-described conditions are satisfied.

The present disclosure also provides a carbon dioxide absorbent containing the cucurbituril-polyethylenimine complex according to the present disclosure.

The present disclosure also provides a carbon dioxide absorbent containing the cucurbituril-polyethylenimine-silica complex according to the present disclosure.

The present disclosure also provides a method for preparing a cucurbituril-polyethylenimine complex, which includes a step of mixing and dispersing a cucurbituril represented by Chemical Formula 1, polyethylenimine and a solvent:

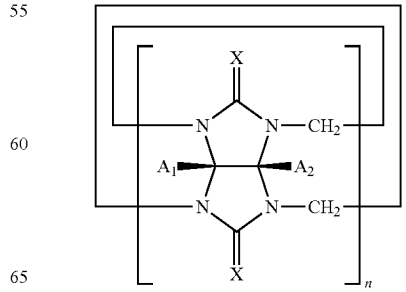

[Chemical Formula 1]

wherein n is an integer from 4 to 20,

X is O, S or NH, and each of $A_1$ and $A_2$, which are identical to or different from each other, is independently H, OR, SR, NHR, COOH, $O(CH_2)_aR$ or $O(CH_2)_aSR$, wherein a is an integer from 1 to 5 and R is H, a halogen, $C_1$-$C_{30}$ alkyl, $C_2$-$C_{30}$ alkenyl, $C_2$-$C_{30}$ alkynyl, $C_2$-$C_{30}$ carbonylalkyl, $C_3$-$C_{30}$ cycloalkyl, $C_2$-$C_{30}$ heterocycloalkyl, $C_6$-$C_{30}$ aryl, $C_6$-$C_{30}$ aryl $C_1$-$C_{30}$ alkyl, $C_2$-$C_{30}$ heteroaryl or $C_2$-$C_{30}$ heteroaryl $C_1$-$C_{30}$ alkyl.

The polyethylenimine may have a molecular weight of 100-50000, specifically 300-30000, more specifically 500-12000.

The solvent may be one or more selected from methanol, ethanol, water, dimethylformamide, diethylformamide, N-methyl-2-pyrrolidone, dimethyl sulfoxide and dimethylacetamide, although not being limited thereto. Specifically, anhydrous methanol may be used.

The present disclosure also provides a method for preparing a cucurbituril-polyethylenimine-silica complex, which includes (a) a step of obtaining a dispersion solution containing a cucurbituril-polyethylenimine complex by mixing and dispersing a cucurbituril represented by Chemical Formula 1, polyethylenimine and a solvent, and (b) a step of further mixing silica in the dispersion solution:

[Chemical Formula 1]

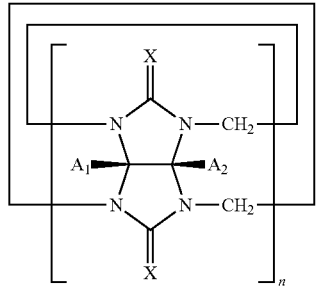

wherein n is an integer from 4 to 20,

X is O, S or NH, and each of $A_1$ and $A_2$, which are identical to or different from each other, is independently H, OR, SR, NHR, COOH, $O(CH_2)_aR$ or $O(CH_2)_aSR$, wherein a is an integer from 1 to 5 and R is H, a halogen, $C_1$-$C_{30}$ alkyl, $C_2$-$C_{30}$ alkenyl, $C_2$-$C_{30}$ alkynyl, $C_2$-$C_{30}$ carbonylalkyl, $C_3$-$C_{30}$ cycloalkyl, $C_2$-$C_{30}$ heterocycloalkyl, $C_6$-$C_{30}$ aryl, $C_6$-$C_{30}$ aryl $C_1$-$C_{30}$ alkyl, $C_2$-$C_{30}$ heteroaryl or $C_2$-$C_{30}$ heteroaryl $C_1$-$C_{30}$ alkyl.

The cucurbituril represented by Chemical Formula 1 may be cucurbit[6]uril wherein n is 6, each of $A_1$ and $A_2$ is independently H, and X is O.

The polyethylenimine may have a molecular weight of 100-50000, specifically 300-30000, more specifically 500-12000.

The solvent may be one or more selected from methanol, ethanol, water, dimethylformamide, diethylformamide, N-methyl-2-pyrrolidone, dimethyl sulfoxide and dimethylacetamide, although not being limited thereto. Specifically, anhydrous methanol may be used.

The cucurbituril-polyethylenimine-silica complex may have a BET specific surface area of 1-500 $m^2/g$, specifically 10-300 $m^2/g$, more specifically 20-60 $m^2/g$.

Specifically, a dispersion solution wherein the cucurbituril-polyethylenimine complex has been formed may be obtained through the step (a).

Then, a cucurbituril-polyethylenimine-silica complex wherein the formed cucurbituril-polyethylenimine complex is included inside the silica may be formed through the step (b).

A step of activating the silica at 50-500° C., specifically 70-300° C., more specifically 150-250° C., for 1-100 hours, specifically 10-50 hours, more specifically 20-30 hours, in advance may be further included before the step (b). Through this activation of the silica in advance, water inside the silica may be removed completely.

Although not stated explicitly in the following examples or comparative example, the cucurbituril-polyethylenimine-silica complexes prepared by varying the molecular weight of polyethylenimine, the solvent, the activation of the silica before the step (b), the weight ratio of the cucurbituril-polyethylenimine complex and the silica and the BET specific surface area of the cucurbituril-polyethylenimine-silica complex were investigated by transmission electron microscopy (TEM) after 3000 cycles of carbon dioxide adsorption.

As a result, when all the conditions that (i) the cucurbituril is cucurbit[6]uril, (ii) the polyethylenimine has a molecular weight of 500-12000, (iii) the solvent is anhydrous methanol, (iv) a step of activating the silica at 150-250° C. for 20-30 hours in advance is further included before the step (b), (v) the weight ratio of the cucurbituril-polyethylenimine complex and the silica is 1:0.5-1.5 and (vi) the cucurbituril-polyethylenimine-silica complex has a BET specific surface area of 20-60 $m^2/g$ were satisfied, no aggregation of the cucurbituril-polyethylenimine-silica complex even after the 3000 cycles occurred and the cucurbituril-polyethylenimine complex included inside the silica of the complex was not lost at all, unlike under other conditions. When any one of the above conditions was not satisfied, significant aggregation of the cucurbituril-polyethylenimine-silica complex occurred after the 3000 cycles and the cucurbituril-polyethylenimine complex included inside the silica of the complex was significantly lost.

Hereinafter, the preparation examples and examples according to the present disclosure are described in detail referring to the attached drawings.

EXAMPLES 1-4

Synthesis of Cucurbituril-PEI Complex (CB[6]-PEI)

A cucurbituril-PEI complex (CB[6]-PEI) (0.2 g) was obtained by adding PEI with a molecular weight of 0.6 KDa, 1.2 KDa, 1.8 KDa or 10 KDa and cucurbit[6]uril to a beaker containing anhydrous methanol (1.6 g) and then dispersing the same by stirring. Examples 1-4 correspond to the molecular weight of the PEI, 0.6 KDa, 1.2 KDa, 1.8 KDa and 10 KDa, respectively (see FIG. 1).

EXAMPLES 5-8

Synthesis of Cucurbituril-PEI-Silica Complex (CB[6]-PEI@Silica)

A cucurbituril-PEI-silica complex wherein the CB[6]-PEI of each of Examples 1-4 was included inside silica was synthesized. First, 100 g of silica (Aldrich 381276, SA=175-225 $m^2/g$) was activated in advance at 200° C. for 1 day to obtain 1 g of activated silica. 0.2 g of the activated silica was added to the dispersion solution of CB[6]-PEI (0.2 g) each of Examples 1-4 and then stirred further for 30 minutes. Then, a cucurbituril-PEI-silica complex (CB[6]-

PEI@Silica) was synthesized by drying the final product at 70° C. for 16 hours under dynamic vacuum. Examples 5-8 correspond to the molecular weight of the PEI, 0.6 KDa, 1.2 KDa, 1.8 KDa and 10 KDa, respectively (BET SA; Example 5: 89 m$^2$/g, Example 6: 88 m$^2$/g, Example 7: 39 m$^2$/g, Example 8: 49 m$^2$/g).

COMPARATIVE EXAMPLE 1

Synthesis of PEI@Silica Complex

After adding PEI with a molecular weight of 1.8 KDa to a beaker containing anhydrous methanol (1.6 g) and then dispersing the same by stirring, 0.2 g of the silica activated in advance in Example 5 was added and the mixture was stirred further for 30 minutes. Then, a PEI@Silica complex wherein the PEI was included inside the silica was synthesized by drying the final product at 70° C. for 16 hours under dynamic vacuum.

TEST EXAMPLE

In order to elucidate the supramolecular structure of the cucurbituril-PEI complexes synthesized in Examples 1-4, a small amount of the cucurbit[6]uril-PEI complex was dissolved in D$_2$O and 1D and 2D nuclear magnetic resonance ($^1$H-NMR) spectra were obtained. Solid NMR spectra were obtained to investigate the CO$_2$ adsorption amount and regeneration performance of the cucurbit[6]uril-PEI@Silica complex. Thermogravimetric analysis (TGA) data were obtained while heating from 25° C. to 800° C. at a rate of 10° C./min under nitrogen atmosphere. Carbon dioxide adsorption isotherms were measured through a volumetric method after regenerating the sample at 110° C. under vacuum. Carbon dioxide adsorption amount and repeated adsorption-regeneration cycles depending on temperature were measured via a weight method of magnetic suspension balance.

Figure 2A:
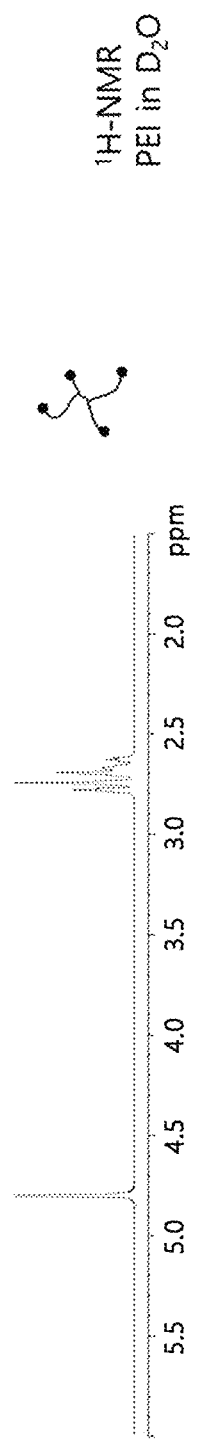
FIGS. 2A, 2B, 2C, 2D and 2E show the nuclear magnetic resonance ($^1$H-NMR) spectra of cucurbituril-PEI complexes synthesized in Examples 1-4 of the present disclosure (FIG. 2A: polyethylenimine in $D_2O$, FIG. 2B: Example 1, FIG. 2C: Example 2, FIG. 2D: Example 3, FIG. 2E: Example 4).
Figure 2B:
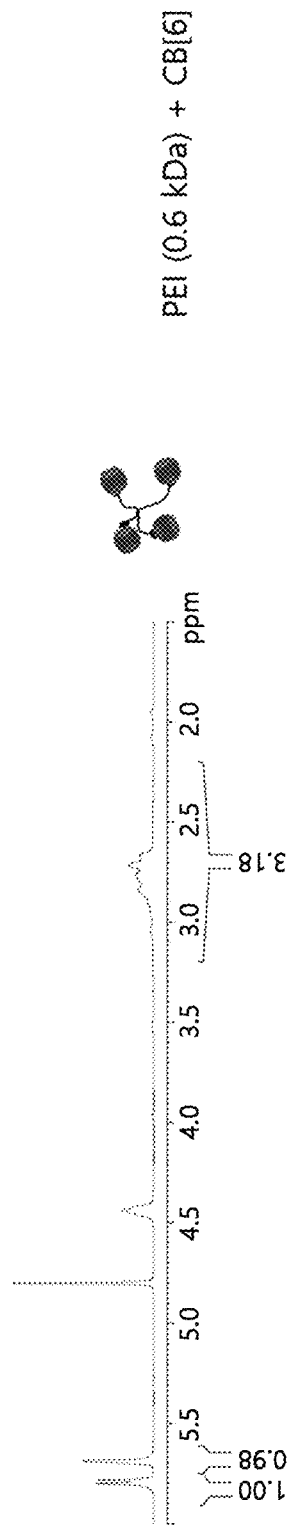
Figure 2C:
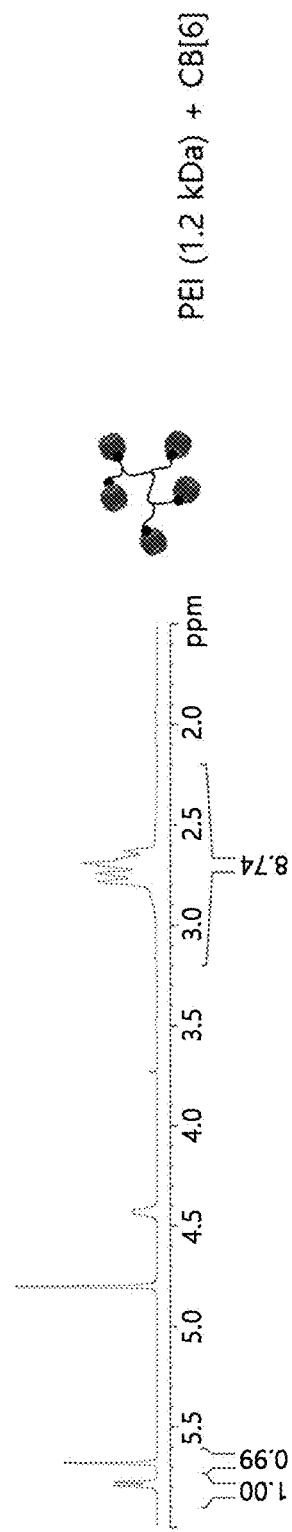
Figure 2D:
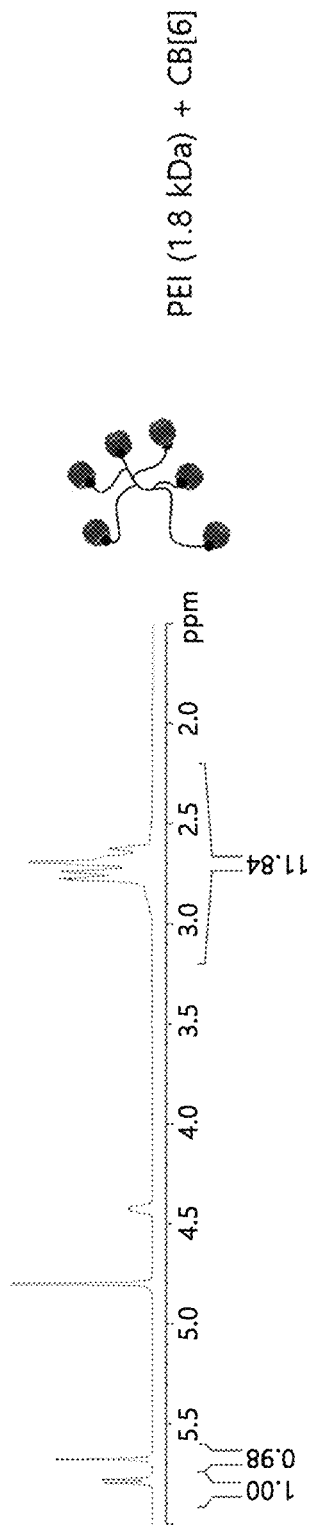
Figure 2E:
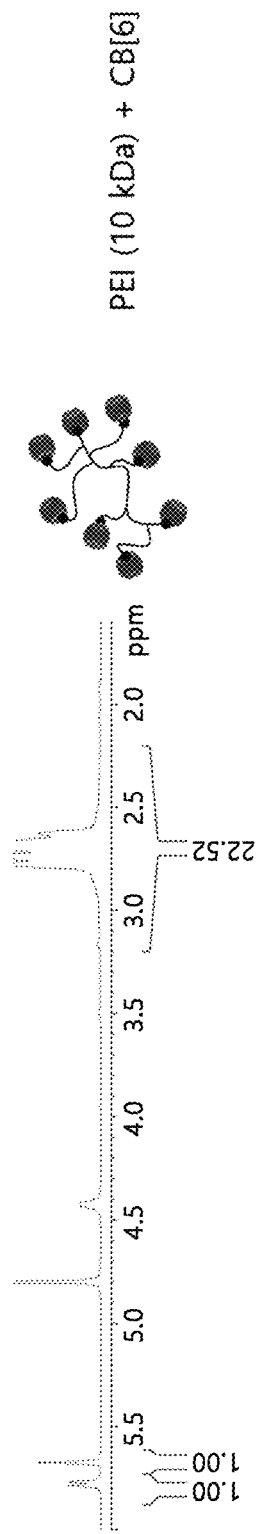

FIGS. 2A, 2B, 2C, 2D and 2E show the nuclear magnetic resonance ($^1$H-NMR) spectra of the cucurbituril-PEI complexes synthesized in Examples 1-4 of the present disclosure (FIG. 2A: polyethylenimine in D$_2$O, FIG. 2B: Example 1, FIG. 2C: Example 2, FIG. 2D: Example 3, FIG. 2E: Example 4), and FIG. 3 shows the 2D DOSY (diffusion-ordered NMR spectroscopy) result of the cucurbituril-PEI (0.6 K) complex synthesized in Example 1 of the present disclosure.

Referring to FIGS. 2A-2E, it can be seen from the nuclear magnetic resonance ($^1$H-NMR) spectra that peak shift is observed due to the binding of the primary amine of PEI to the carbonyl group of CB[6]. The binding amount of CB[6] was decreased as the molecular weight of the PEI increased, which is because the binding of CB[6] occurs only at the terminal primary amine of the PEI.

Figure 3:
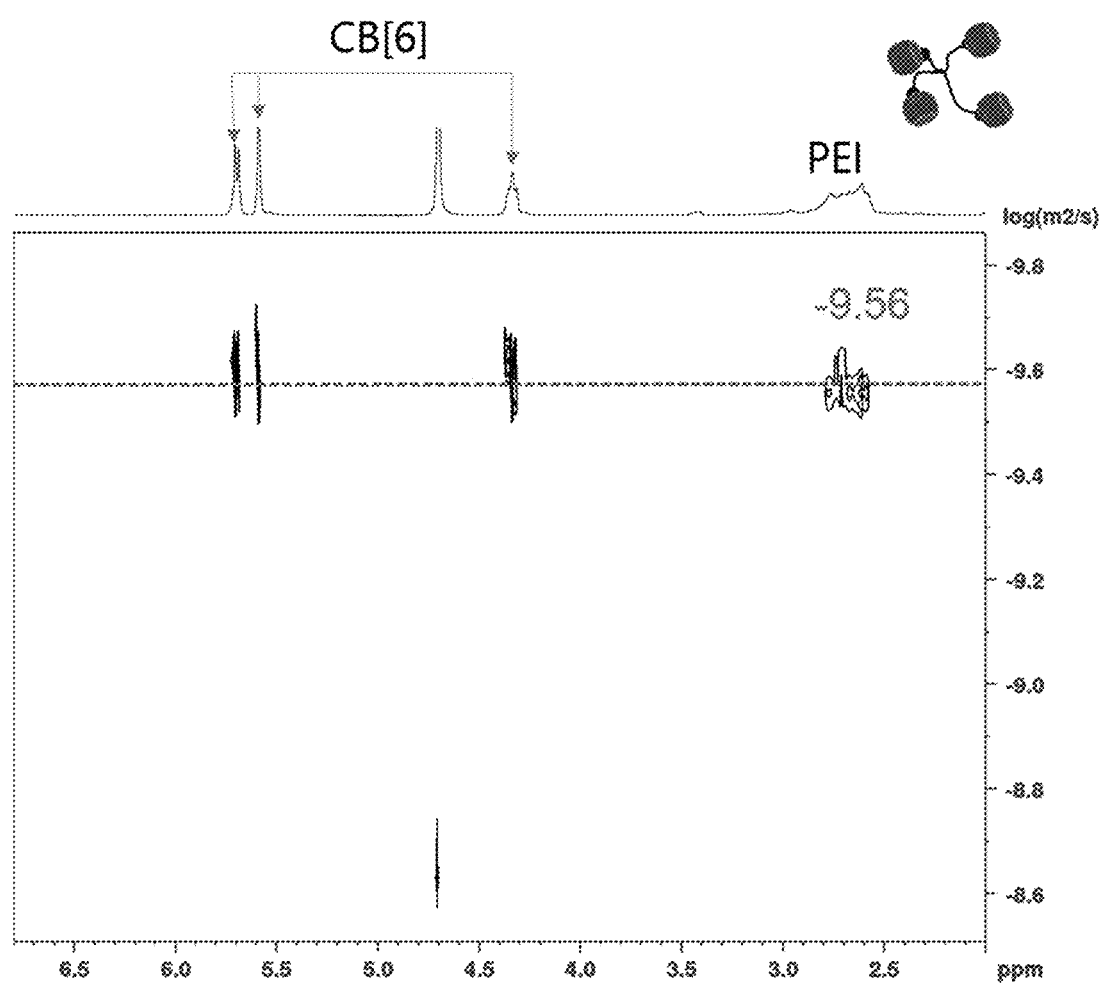
FIG. 3 shows the 2D DOSY (diffusion-ordered NMR spectroscopy) result of a cucurbituril-PEI (0.6 K) complex synthesized in Example 1 of the present disclosure.

And, referring to FIG. 3, it can be see that the CB[6] and the PEI (0.6 K) show the same diffusion coefficient, which suggests the formation of a supramolecular structure.

Figure 4A:
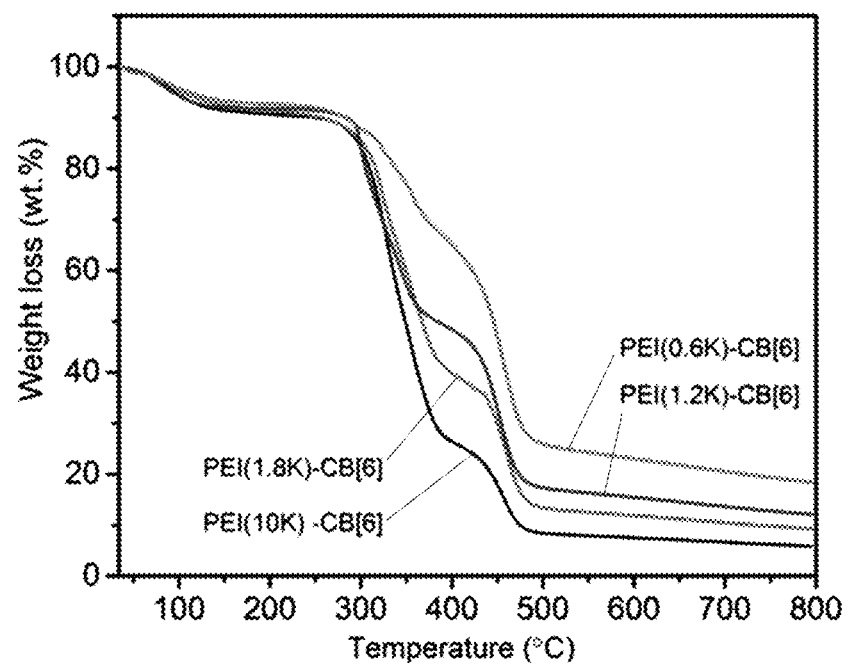
FIGS. 4A and 4B show the thermogravimetric analysis (TGA) result (FIG. 4A) and DTG (derivative TG) curves (FIG. 4B) of cucurbit[6]uril-PEI complexes synthesized in Examples 1-4 of the present disclosure [Example 1: PEI (0.6 K)-CB[6], Example 2: PEI (1.2 K)-CB[6], Example 3: PEI (1.8 K)-CB[6], Example 4: PEI (10 K)-CB[6]].
Figure 4B:
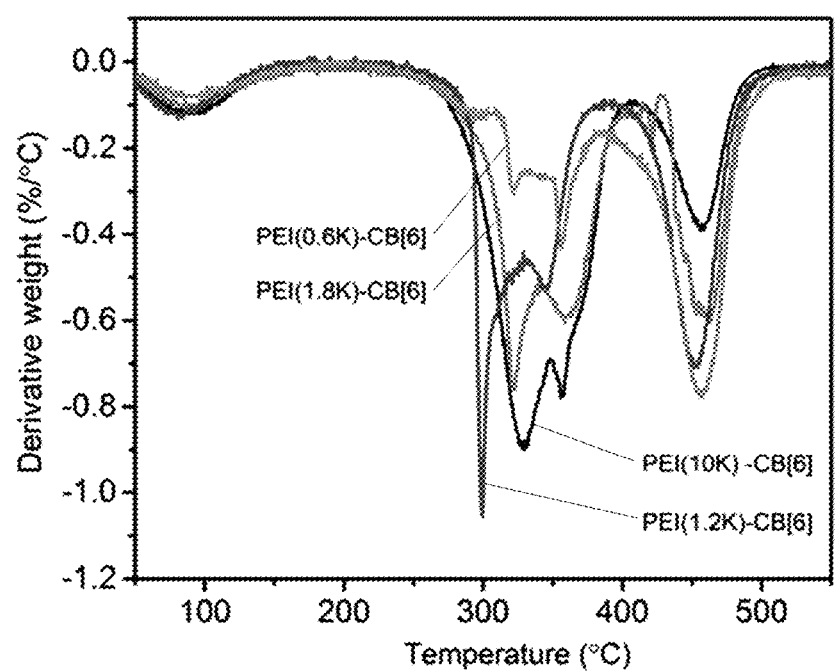

FIGS. 4A and 4B show the thermogravimetric analysis (TGA) result (FIG. 4A) and DTG (derivative TG) curves (FIG. 4B) of the cucurbit[6]uril-PEI complexes synthesized in Examples 1-4 of the present disclosure [Example 1: PEI (0.6 K)-CB[6], Example 2: PEI (1.2 K)-CB[6], Example 3: PEI (1.8 K)-CB[6], Example 4: PEI (10 K)-CB[6]].

Referring to FIGS. 4A and 4B, it can be seen that the cucurbit[6]uril-PEI complex according to the present disclosure shows thermal stability up to 250° C.

Figure 5:
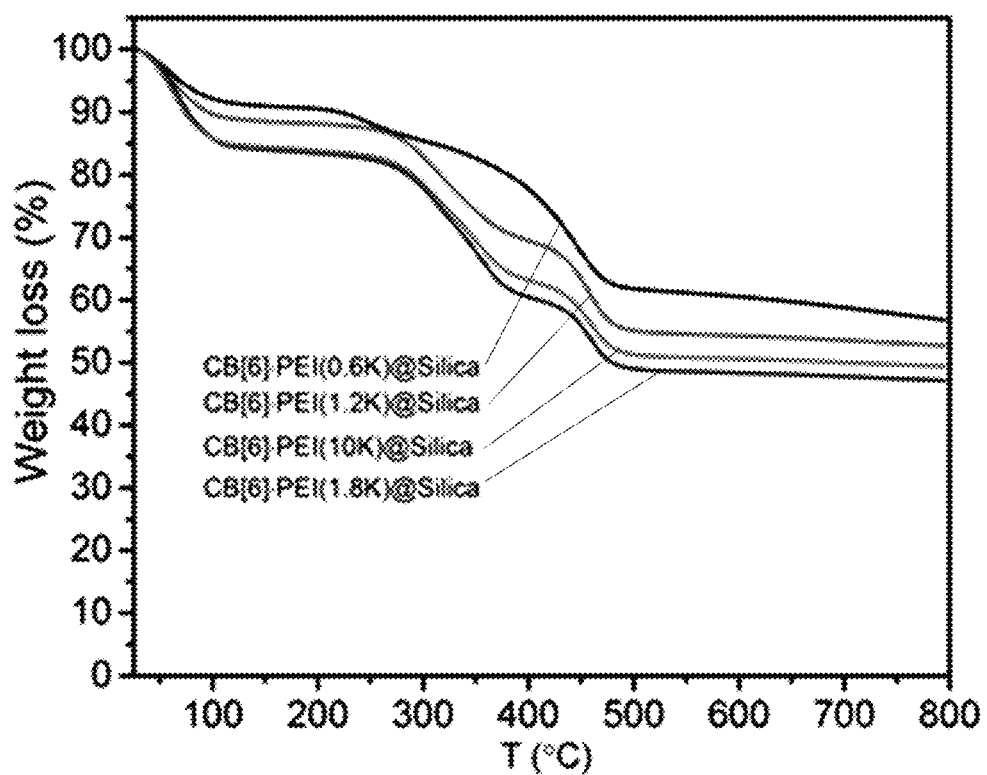
FIG. 5 shows the thermogravimetric analysis (TGA) result of cucurbit[6]uril-PEI-silica complexes synthesized in Examples 5-8 of the present disclosure [Example 5: CB[6].PEI (0.6 K)@Silica, Example 6: CB[6].PEI (1.2 K)@Silica, Example 7: CB[6].PEI (1.8 K)@Silica, Example 8: CB[6].PEI (10 K)@Silica].

FIG. 5 shows the thermogravimetric analysis (TGA) result of the cucurbit[6]uril-PEI-silica complexes synthesized in Examples 5-8 of the present disclosure [Example 5: CB[6].PEI (0.6 K)@Silica, Example 6: CB[6].PEI (1.2 K)@Silica, Example 7: CB[6].PEI (1.8 K)@Silica, Example 8: CB[6].PEI (10 K)@Silica].

The amount of the cucurbit[6]uril-PEI complex included in the silica can be seen from FIG. 5. It can be seen that the amount of the cucurbit[6]uril-PEI complex included in the silica is 26% based on the total weight of the cucurbit[6]uril-PEI-silica complex for CB[6]-PEI (0.6 K), 32% based on the total weight of the cucurbit[6]uril-PEI-silica complex for CB[6]-PEI (1.2 K), 33% based on the total weight of the cucurbit[6]uril-PEI-silica complex for CB[6]-PEI (1.8 K), and 32% based on the total weight of the cucurbit[6]uril-PEI-silica complex for CB[6]-PEI (10 K).

Figure 6:
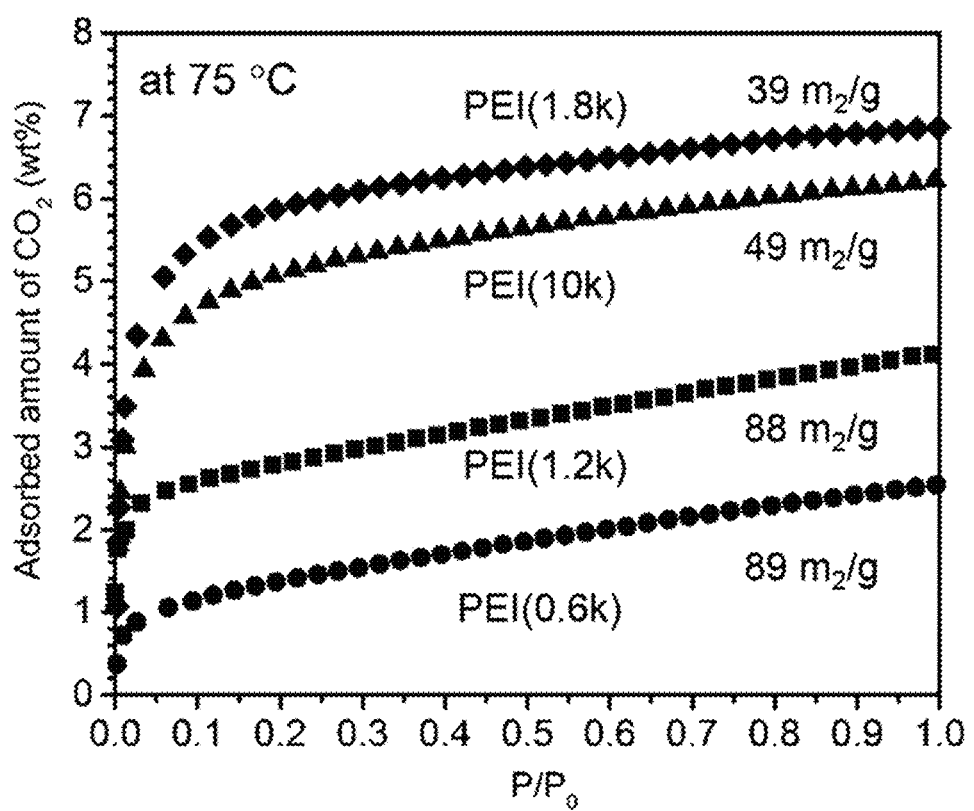
FIG. 6 shows the amount of $CO_2$ adsorbed on cucurbit[6]uril-PEI-silica complexes synthesized in Examples 5-8 of the present disclosure [Example 5: PEI (0.6 K), Example 6: PEI (1.2 K), Example 7: PEI (1.8 K), Example 8: PEI (10 K)].

FIG. 6 shows the amount of CO$_2$ adsorbed on the cucurbit[6]uril-PEI-silica complexes synthesized in Examples 5-8 of the present disclosure [Example 5: PEI (0.6 K), Example 6: PEI (1.2 K), Example 7: PEI (1.8 K), Example 8: PEI (10 K)].

The CO$_2$ adsorption amount depending on the cucurbit[6]uril-PEI complexes can be confirmed from FIG. 6. Although the amount of the cucurbit[6]uril-PEI included in silica was similar in Examples 5-8, the cucurbit[6]uril-PEI (1.8 K)-silica complex containing 1.8 K PEI showed the highest CO$_2$ adsorption amount. In addition, it was confirmed that the cucurbit[6]uril-PEI (1.8 K)-silica complex containing 1.8 K PEI showed the most superior carbon dioxide adsorption amount although the specific surface area was the smallest. It may be because the amine of the PEI for binding with CO$_2$ is dispersed well.

Figure 7:
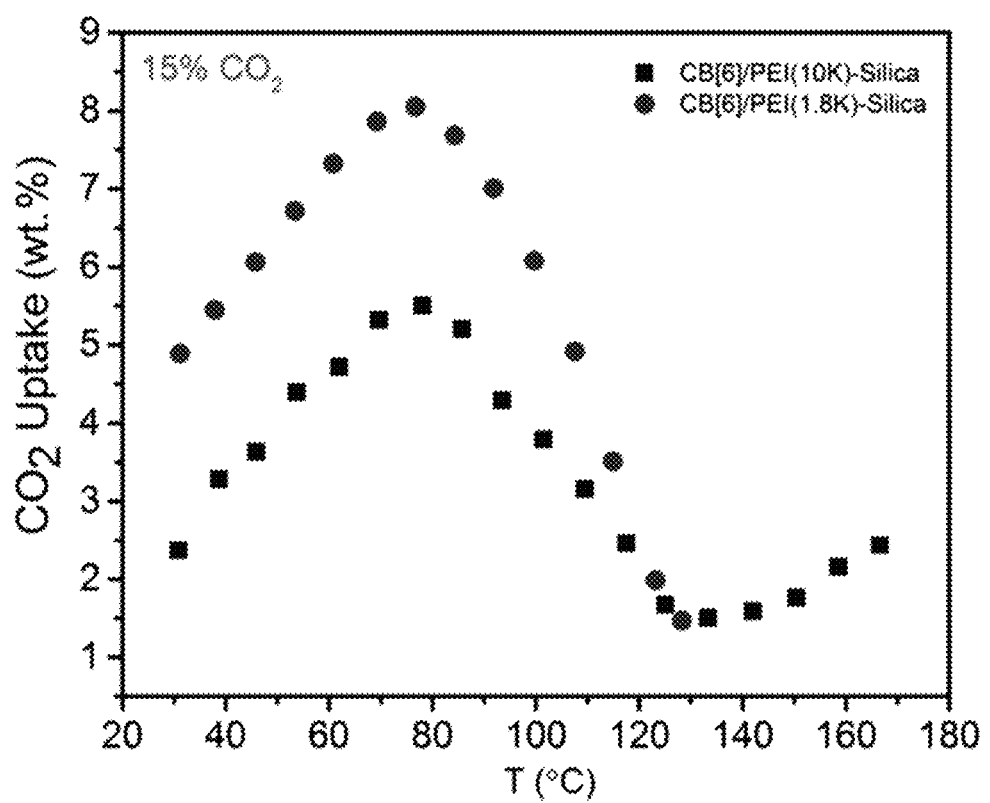
FIG. 7 compares the amount of $CO_2$ adsorbed on cucurbit[6]uril-PEI (1.8 K)-silica synthesized in Example 7 and a cucurbit[6]uril-PEI (10 K)-silica complex synthesized in Example 8 of the present disclosure depending on temperature [Example 7: CB[6]/PEI (1.8 K)-silica, Example 8: CB[6]/PEI (10 K)-silica].

FIG. 7 compares the amount of CO$_2$ adsorbed on the cucurbit[6]uril-PEI (1.8 K)-silica synthesized in Example 7 and the cucurbit[6]uril-PEI (10 K)-silica complex synthesized in Example 8 of the present disclosure depending on temperature [Example 7: CB[6]/PEI (1.8 K)-silica, Example 8: CB[6]/PEI (10 K)-silica].

Referring to FIG. 7, it can be seen that the carbon dioxide adsorption amount of the cucurbit[6]uril-PEI (1.8 K)-silica complex is remarkably superior as compared to the cucurbit[6]uril-PEI (10 K)-silica complex.

Figure 8A:
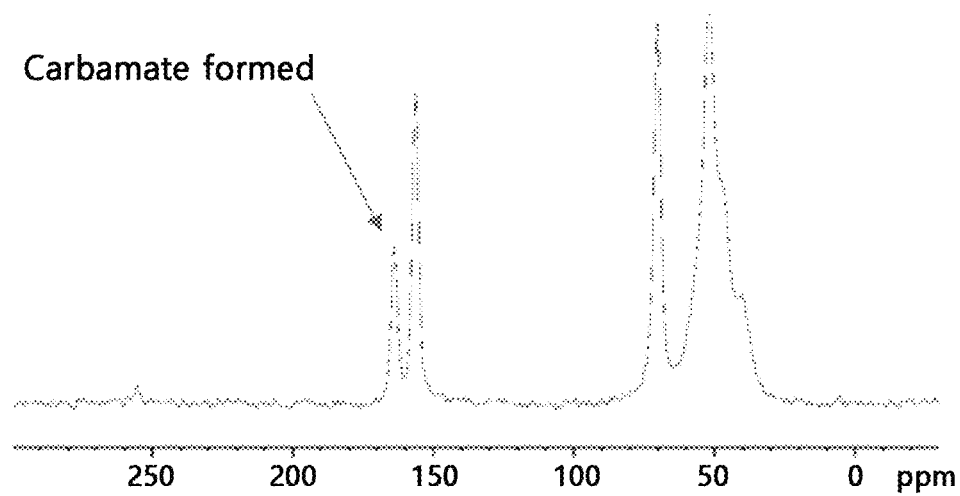
FIGS. 8A and 8B show nuclear magnetic resonance ($^{13}$C-NMR) spectra showing adsorption of $CO_2$ (FIG. 8A) on a cucurbit[6]uril-PEI (1.8 K)-silica complex synthesized in Example 7 of the present disclosure and regeneration performance at 110° C.
Figure 8B:
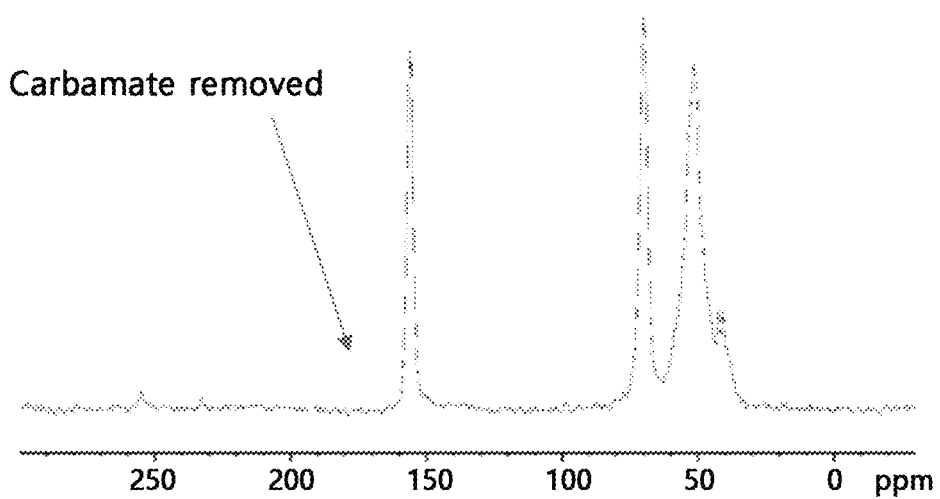

FIGS. 8A and 8B show nuclear magnetic resonance ($^{13}$C-NMR) spectra showing adsorption of CO$_2$ (FIG. 8A) on the cucurbit[6]uril-PEI (1.8 K)-silica complex synthesized in Example 7 of the present disclosure and regeneration performance at 110° C. (FIG. 8B).

Referring to FIG. 8A, it can be seen that a carbamate peak occurs at 164 ppm due to CO$_2$ adsorption by the primary amine of the PEI. From FIG. 8B, it can be seen that regeneration was achieved completely at 110° C. because the carbamate peak at 164 ppm disappeared.

Figure 9:
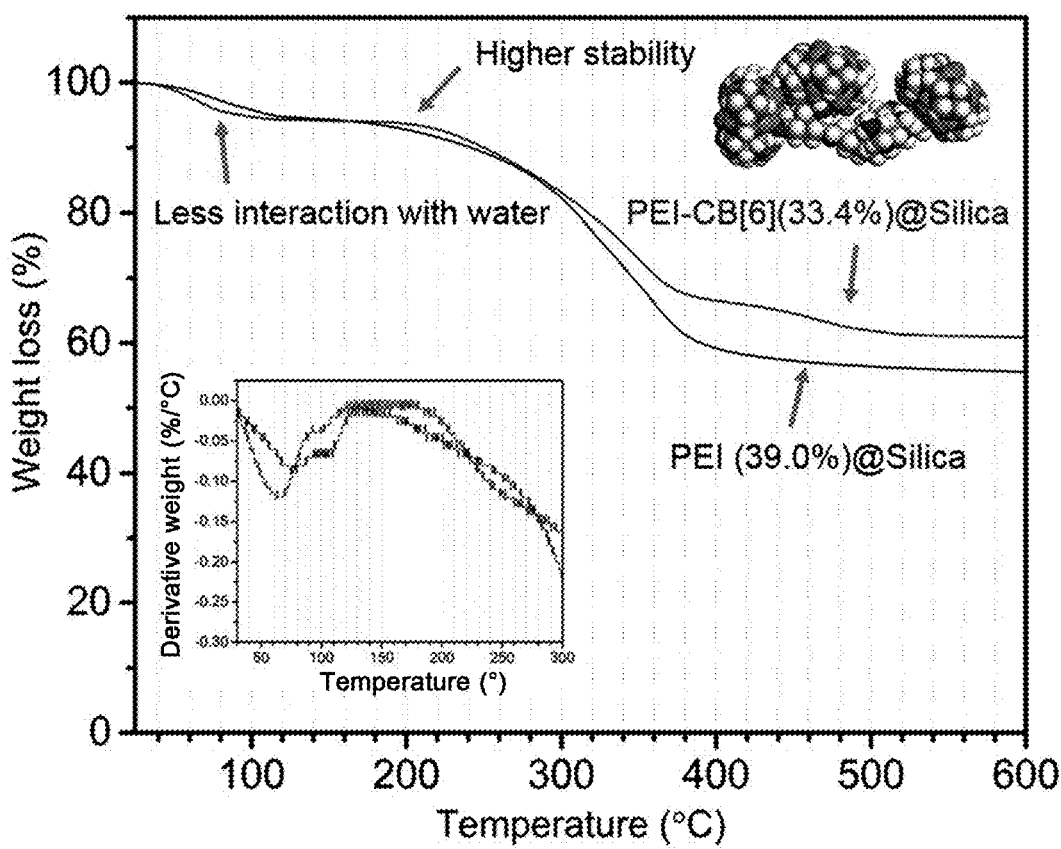
FIG. 9 shows the thermogravimetric analysis (TGA) result of a cucurbituril-PEI (1.8 K)-silica complex synthesized in Example 7 of the present disclosure and a PEI@Silica complex of Comparative Example 1 [Example 7: PEI-CB[6]@Silica, Comparative Example 1: PEI@Silica].

FIG. 9 shows the thermogravimetric analysis (TGA) result of the cucurbituril-PEI (1.8 K)-silica complex synthesized in Example 7 of the present disclosure and the PEI@Silica complex of Comparative Example 1 [Example 7: PEI-CB[6]@Silica, Comparative Example 1: PEI@Silica].

Referring to FIG. 9, it can be seen that the cucurbit[6]uril-PEI (1.8 K)-silica complex is thermally more stable than the PEI@Silica.

Figure 10:
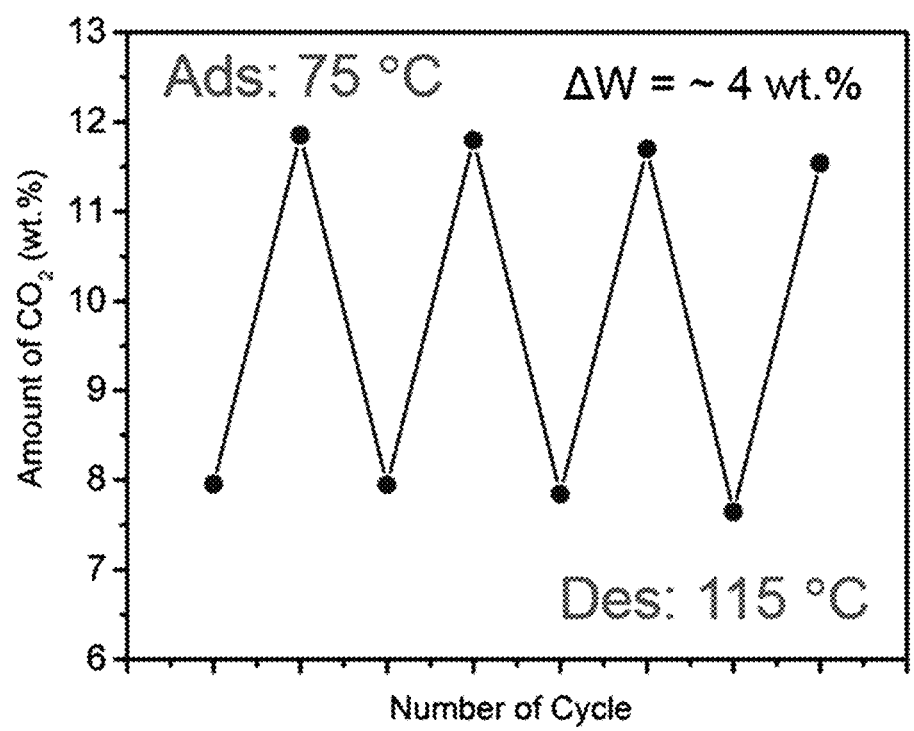
FIG. 10 shows the amount of carbon dioxide adsorbed on a cucurbit[6]uril-PEI (1.8 K)-silica complex synthesized in Example 7 of the present disclosure when adsorption at 75° C. and regeneration at 115° C. are repeated.

FIG. 10 shows the amount of carbon dioxide adsorbed on the cucurbit[6]uril-PEI (1.8 K)-silica complex synthesized in Example 7 of the present disclosure when adsorption at 75° C. and regeneration at 115° C. are repeated.

Referring to FIG. 10, it can be seen that a dynamic adsorption amount of about 4 wt % is maintained even after repeated adsorption at 75° C. and regeneration at 115° C.

Figure 11A:
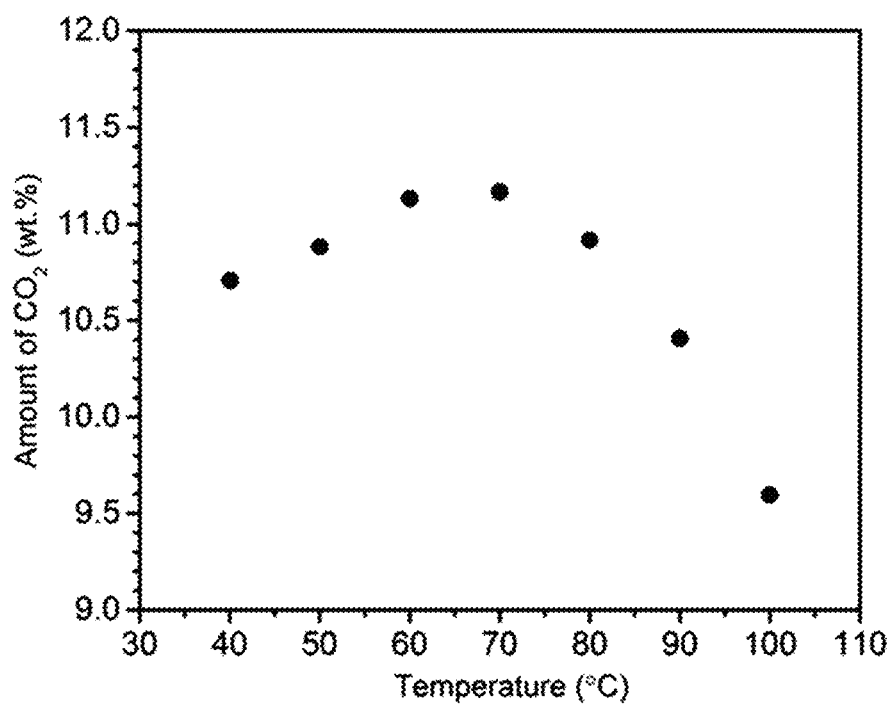
FIGS. 11A and 11B show the amount of carbon dioxide adsorbed on a PEI (1.8 K)@Silica complex synthesized in Comparative Example 1 of the present disclosure depending on temperature (FIG. 11A) as well as a carbon dioxide adsorption-regeneration cycle graph (FIG. 11B).
Figure 11B:
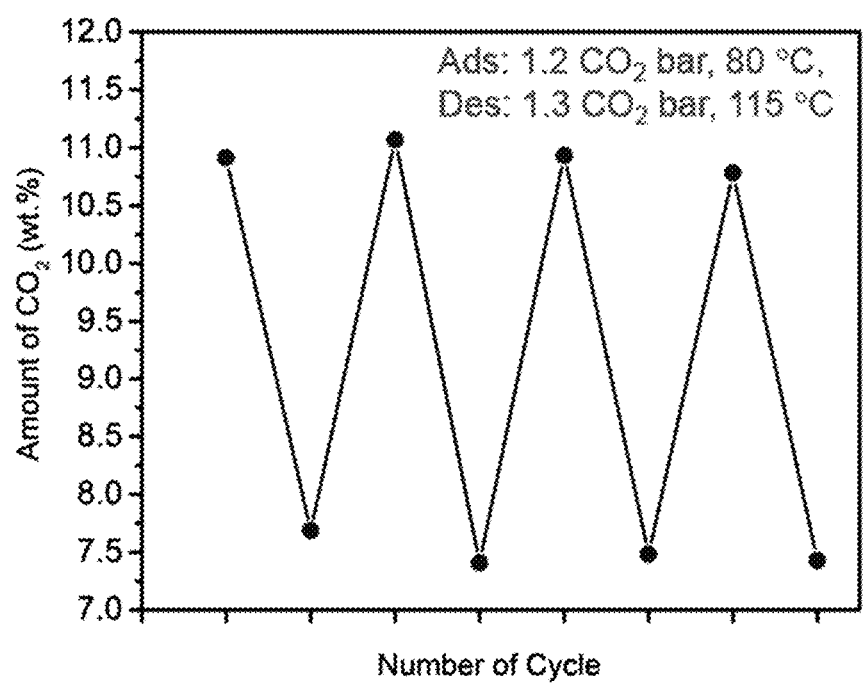

FIGS. 11A and 11B show the amount of carbon dioxide adsorbed on the PEI (1.8 K)@Silica complex synthesized in Comparative Example 1 of the present disclosure depending on temperature (FIG. 11A) as well as a carbon dioxide adsorption-regeneration cycle graph (FIG. 11B).

Referring to FIG. 11A, the PEI (1.8 K)@Silica complex showed the maximum carbon dioxide adsorption amount at 70° C. After the repeated adsorption-regeneration cycles, a carbon dioxide adsorption amount of 3.4 wt % was observed as shown in FIG. 11B.

Figure 12A:
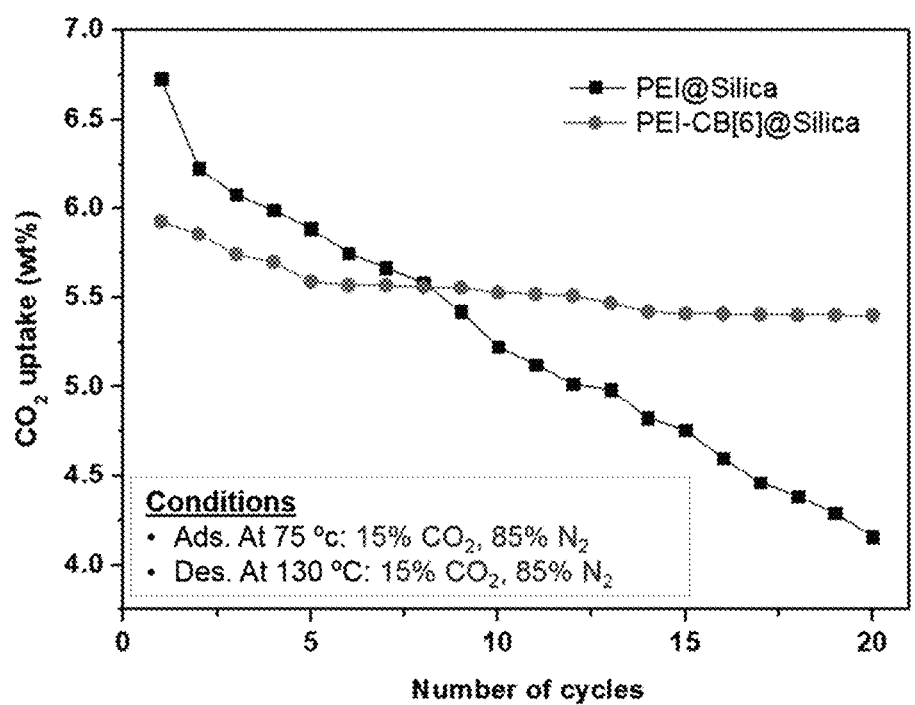
FIGS. 12A and 12B show the carbon dioxide adsorption cycle stability of a cucurbit[6]uril-PEI (1.8 K)-silica complex synthesized in Example 7 of the present disclosure and a PEI (1.8 K)@Silica complex of Comparative Example 1.
Figure 12B:
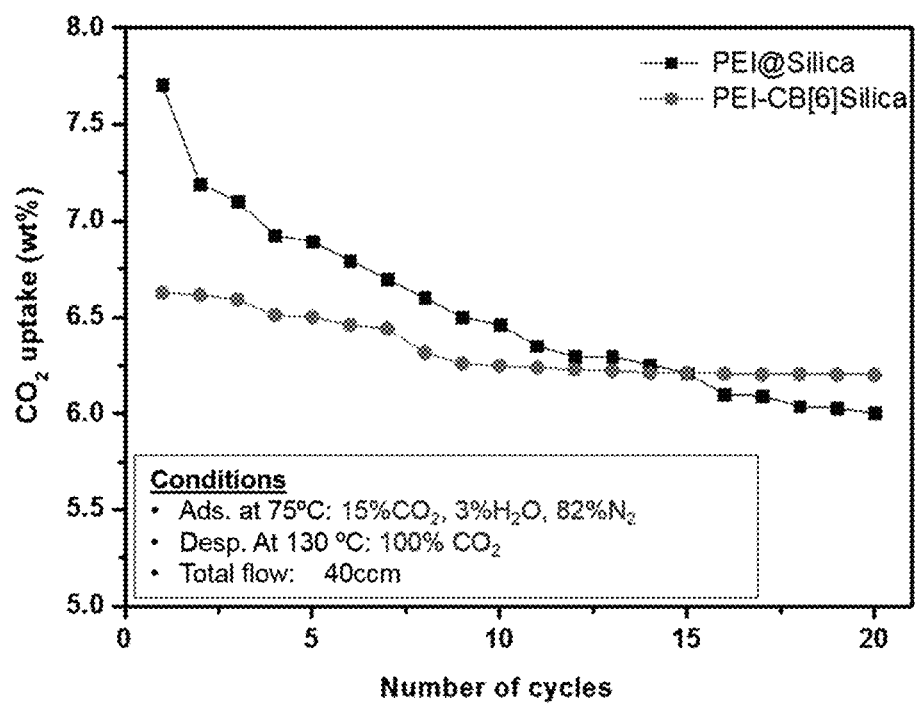

FIGS. 12A and 12B show the carbon dioxide adsorption cycle stability of the cucurbit[6]uril-PEI (1.8 K)-silica complex synthesized in Example 7 of the present disclosure and the PEI (1.8 K)@Silica complex of Comparative Example 1. FIG. 12A and FIG. 12B show results under different adsorption-desorption conditions [Adsorption-desorption conditions are described in the graphs. Example 7: PEI-CB[6]@Silica, Comparative Example 1: PEI@Silica].

Referring to FIGS. 12A and 12B, it can be seen that the cucurbit[6]uril-PEI (1.8 K)-silica complex of Example 7 shows remarkably superior carbon dioxide adsorption cycle stability as compared to the PEI (1.8 K)@Silica complex of Comparative Example 1 under different conditions.

According to the present disclosure, a cucurbituril-polyethylenimine-silica complex may be prepared by forming a complex wherein a cucurbituril is bound to polyethylenimine and including the same inside silica, and it may be used as a carbon dioxide absorbent with superior thermal stability and prevented formation of urea.

What is claimed is:

1. A cucurbituril-polyethylenimine complex wherein a cucurbituril represented by Chemical Formula 1 is bound to polyethylenimine:

[Chemical Formula 1]

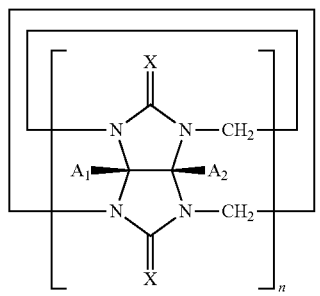

wherein n is an integer from 4 to 20,

X is O, S or NH, and each of $A_1$ and $A_2$, which are identical to or different from each other, is independently H, OR, SR, NHR, COOH, $O(CH_2)_aR$ or $O(CH_2)_aSR$, wherein a is an integer from 1 to 5 and R is H, a halogen, $C_1$-$C_{30}$ alkyl, $C_2$-$C_{30}$ alkenyl, $C_2$-$C_{30}$ alkynyl, $C_2$-$C_{30}$ carbonylalkyl, $C_3$-$C_{30}$ cycloalkyl, $C_2$-$C_{30}$ heterocycloalkyl, $C_6$-$C_{30}$ aryl, $C_6$-$C_{30}$ aryl $C_1$-$C_{30}$ alkyl, $C_2$-$C_{30}$ heteroaryl or $C_2$-$C_{30}$ heteroaryl $C_1$-$C_{30}$ alykl, wherein the cucurbituril represented by Chemical Formula 1 is cucurbit[6]uril, wherein n is 6, each of $A_1$ and $A_2$ is independently H, and X is O.

2. The cucurbituril-polyethylenimine complex according to claim 1, wherein the polyethylenimine has a molecular weight of 100-50000.

3. A cucurbituril-polyethylenimine-silica complex comprising a silica and the cucurbituril-polyethylenimine complex according to claim 1, which is included inside the silica.

4. The cucurbituril-polyethylenimine-silica complex according to claim 3, wherein the cucurbituril-polyethylenimine-silica complex has a BET specific surface area of 1-500 m²/g.

5. The cucurbituril-polyethylenimine-silica complex according to claim 3, wherein the cucurbituril is cucurbit[6]uril, the polyethylenimine has a molecular weight of 500-12000, and the cucurbituril-polyethylenimine-silica complex has a BET specific surface area of 20-60 m²/g.

6. A carbon dioxide absorbent comprising the cucurbituril-polyethylenimine complex according to claim 1.

7. A carbon dioxide absorbent comprising the cucurbituril-polyethylenimine-silica complex according to claim 3.

8. A method for preparing a cucurbituril-polyethylenimine complex, which comprises a step of mixing and dispersing a cucurbituril represented by Chemical Formula 1, polyethylenimine and a solvent:

[Chemical Formula 1]

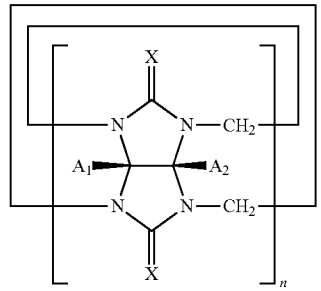

wherein n is an integer from 4 to 20,

X is O, S or NH, and each of $A_1$ and $A_2$, which are identical to or different from each other, is independently H, OR, SR, NHR, COOH, $O(CH_2)_aR$ or $O(CH_2)_aSR$, wherein a is an integer from 1 to 5 and R is H, a halogen, $C_1$-$C_{30}$ alkyl, $C_2$-$C_{30}$ alkenyl, $C_2$-$C_{30}$ alkynyl, $C_2$-$C_{30}$ carbonylalkyl, $C_3$-$C_{30}$ cycloalkyl, $C_2$-$C_{30}$ heterocycloalkyl, $C_6$-$C_{30}$ aryl, $C_6$-$C_{30}$ aryl $C_1$-$C_{30}$ alkyl, $C_2$-$C_{30}$ heteroaryl or $C_2$-$C_{30}$ heteroaryl $C_1$-$C_{30}$ alkyl, wherein the cucurbituril represented by Chemical Formula 1 is cucurbit[6]uril, wherein n is 6, each of $A_1$ and $A_2$ is independently H, and X is O.

9. The method for preparing a cucurbituril-polyethylenimine complex according to claim 8, the solvent is one or more selected from methanol, ethanol, water, dimethylformamide, diethylformamide, N-methyl-2-pyrrolidone, dimethyl sulfoxide and dimethylacetamide.

10. A method for preparing a cucurbituril-polyethylenimine-silica complex, which comprises:

(a) a step of obtaining a dispersion solution comprising a cucurbituril-polyethylenimine complex by mixing and dispersing a cucurbituril represented by Chemical Formula 1, polyethylenimine and a solvent, and (b) a step of further mixing silica in the dispersion solution:

[Chemical Formula 1]

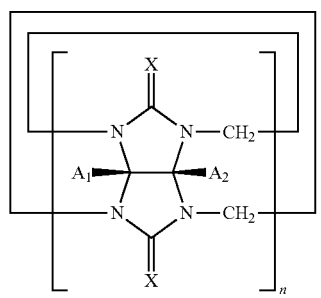

wherein n is an integer from 4 to 20,

X is O, S or NH, and each of $A_1$ and $A_2$, which are identical to or different from each other, is independently H, OR, SR, NHR, COOH, $O(CH_2)_aR$ or $O(CH_2)_aSR$, wherein a is an integer from 1 to 5 and R is H, a halogen, $C_1$-$C_{30}$ alkyl, $C_2$-$C_{30}$ alkenyl, $C_2$-$C_{30}$ alkynyl, $C_2$-$C_{30}$ carbonylalkyl, $C_3$-$C_{30}$ cycloalkyl, $C_2$-$C_{30}$ heterocycloalkyl, $C_6$-$C_{30}$ aryl, $C_6$-$C_{30}$ aryl $C_1$-$C_{30}$ alkyl, $C_2$-$C_{30}$ heteroaryl or $C_2$-$C_{30}$ heteroaryl $C_1$-$C_{30}$ alkyl.

11. The method for preparing a cucurbituril-polyethylenimine-silica complex according to claim 10, wherein the cucurbituril is cucurbit[6]uril, the polyethylenimine has a molecular weight of 500-12000, the solvent is anhydrous methanol, a step of activating the silica at 150-250° C. for 20-30 hours in advance is further included before the step (b), a weight ratio of the cucurbituril-polyethylenimine complex and the silica is 1: 0.5-1.5, and the cucurbituril-polyethylenimine-silica complex has a BET specific surface area of 20-60 m²/g.

* * * * *